Patented July 6, 1954

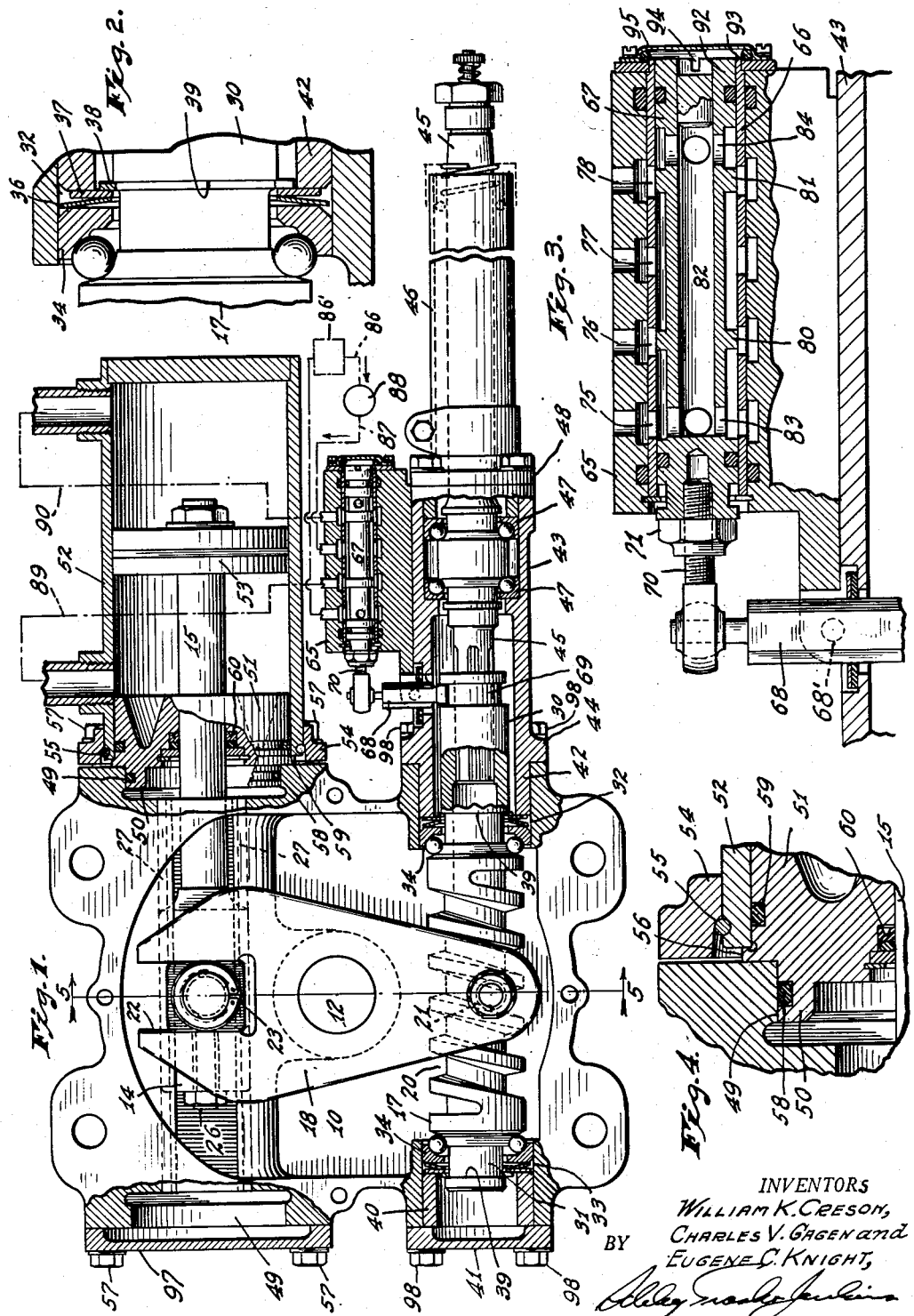

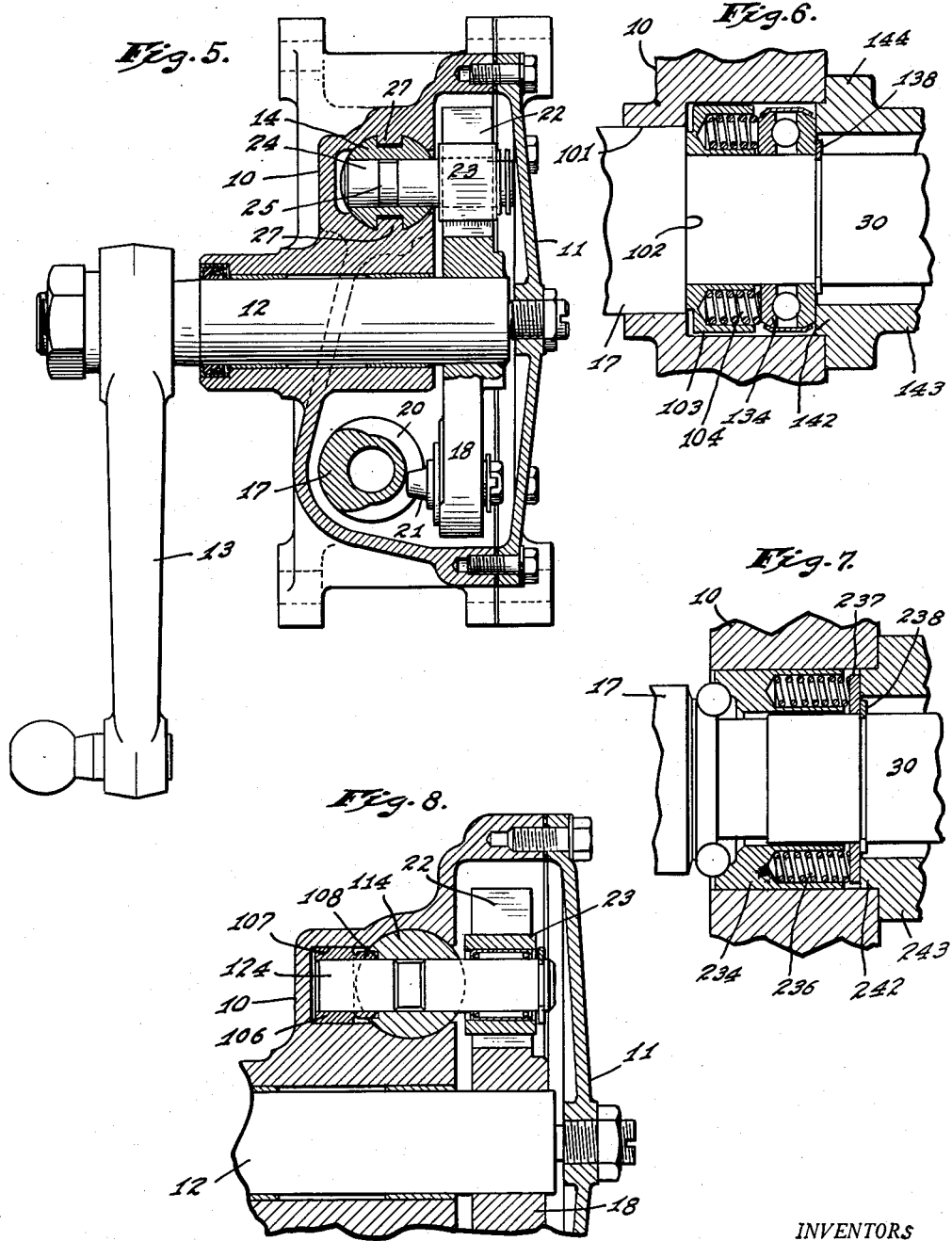

2,682,778

UNITED STATES PATENT OFFICE 2,682,778

POWER STEERING GEAR

William K. Creson, Charles V. Gagen, and Eugene C. Knight, Lafayette, Ind., assignors to Ross Gear & Tool Company, Lafayette, Ind., a corporation of Indiana Application July 15, 1950, Serial No. 174,098

15 Claims. (Cl. 74—388)

This invention relates to power-operated steering gears, and more particularly to that type of power-operated steering gear in which the power is not applied until the steering effort increases to some definite predetermined value. It has heretofore been proposed to produce such a steering gear by interconnecting the manually operated steering shaft and the dirigible wheels through a speed-reducing mechanism embodying a rotatable cam or screw-threaded element and by employing axial displacements of such element against a yielding resistance to control the application of power. Usually, the power-applying mechanism has been of the hydraulic type and controlled by a valve which in turn was controlled by axial displacements of the cam or screw-threaded member.

It is an object of this invention to simplify and improve the construction of such steering gears. Another object of the invention is to produce a steering gear which will possess an increased flexibility of installation and arrangement. Still another object of the invention is to facilitate the adjustment of the valve mechanism controlling the application of hydraulic power in a power-operated steering gear.

In carrying out the invention in its preferred form, we employ a housing from which is supported a rock shaft adapted for connection to dirigible wheels of a vehicle. The rock shaft is operatively connected to a helical cam mounted within the housing for manual rotation and for limited axial movement. Yielding means bias the cam to a normal position from which it may be displaced by loads exceeding a predetermined vallue. Exteriorly of the housing and supported therefrom are a hydraulic motor and a control valve therefor, the former operatively connected to the rock shaft and the latter connected to the cam to be operated by axial cam-movements. With respect to the arrangements employed to mount the motor and valve on the housing, the housing is made symmetrical about a plane which extends axially of the rock shaft and normally to the cam-axis, so that the hydraulic motor and the valve can be mounted on either side of the housing, as desired. The valve, which is desirably of the open-center type, embodies a reciprocable valve member located within a stationary, ported sleeve, and the lands on the valve and the ports in the sleeve are so located from finished end surfaces of the valve and sleeve that when those end surfaces are flush with each other the valve will be accurately centered within the sleeve.

The accompanying drawings illustrate the invention: Fig. 1 is a side elevation, in partial section, of the steering gear with the housing-cover removed; Figs. 2, 3, and 4 are fragmental sectional views similar to Fig. 1 but on larger scales; Fig. 5 is a section on the line 5—5 of Fig. 1; Figs. 6 and 7 are views similar to Fig. 2 but illustrating modified constructions; and Fig. 8 is a fragmental view similar to Fig. 5 illustrating another modification.

The steering gear shown in Figs. 1 to 5 embodies a housing 10 having an open side adapted to be closed by a removable cover 11. In the central portion of the housing there is provided a bearing for the reception of a rock shaft 12 which extends outwardly through the closed side of the housing and has secured to its outer end an arm 13 (Fig. 5) adapted for connection to the dirigible wheels of the vehicle in which the steering gear is to be embodied. Above the rock shaft 12, the housing is provided with a guideway for the reception of a slide which may be the head 14 of a piston rod 15. Below the rock shaft 12, there is rotatably supported within the housing a helical cam 17. The guide-way for the piston-rod head 14 and the axis of the cam 17 are parallel to each other and extend in planes normal to the axis of the rock shaft 12 which, within the housing, is provided with a rigid arm 18 operatively connected to both the piston-rod head 14 and the cam 17, as more fully set forth below.

The cam 17 is provided with a helix-like groove 20 which receives a frusto-conical stud 21 mounted on the lower end of the arm 18. The upper end of the arm 18 is provided with a parallel-sided notch 22 which slidably receives a block 23 mounted on and rotatable relatively to a pivot pin 24 which projects laterally from the piston-head 14. To hold the pin 24 in place in the head 14, it may be grooved as shown at 25 in Fig. 5 for the reception of a screw 26 mounted axially in the head 14; and to preserve the desired parallel relationship of the pin 24 and rock shaft 12, the head 14 may be provided with longitudinally extending grooves which receive keys 27 rigid or integral with the housing 10.

The cam 17 is provided at its ends with hubs 30 and 31 rotatably received in aligned openings 32 and 33 in opposite side walls of the housing 10. Desirably, the cam-hubs are supported through anti-friction bearings including outer races 34 which are axially slidable in the openings 32 and 33, respectively. Means now to be described resiliently locates the cam 17 in a normal position axially of itself, such means being so constructed that a predetermined minimum axial force must be applied to the cam before it will move in either direction from its normal position.

One form of cam-locating means, which may be the same at each end of the cam, is shown in detail in Fig. 2. It comprises a dished resilient washer 36 bearing against the outer face of the race 34, a plane washer 37 against which the dished washer reacts, and a split spring ring 38 at the outer face of the washer 37. Each cam hub is formed with an annular groove providing an inwardly facing shoulder 39 against which the ring 38 bears to provide a removable abutment limiting outward axial movement of the washer 37. The parts are so constructed and arranged that, when assembled, the dished washer 36 will be stressed and will bear with a predetermined inwardy directed force against the race 34.

The assembly of the cam and cam-locating means is positioned axially of itself in the housing 10 by providing the latter with abutments which bear against the outer faces of the washers 37. As shown in Fig. 1, one of those abutments, that adjacent the cam-hub 31, is in the form of a spacing collar 40 held in place in the opening 33 by a cap 41 removably secured to the outer face of the housing 10, while the other constitutes a pilot portion 42 of a sleeve 43, such sleeve having an integral attaching flange 44 through which it is secured to the housing 10 with the pilot 42 received in the opening 32 and the body of the sleeve extending outwardly in co-axial relationship with the cam 17.

The cam-hub 30 projects into the sleeve 43 and is provided with an axial hole splined for the reception of a manually rotatable steering shaft 45 enclosed within the conventional tubular steering column 46. Near the outer end of the sleeve 43 there are provided bearings 47, preferably of the anti-friction type, for the steering shaft 45. A cap 48 secured to the outer end of the sleeve 43 is adapted for attachment to the steering column 46.

In alignment with the guide-way for the piston-rod head 14, the side wall of the housing 10 is provided with a machined opening 49 receiving a pilot 50 of a cylinder head 51. The body of the cylinder head 51 is adapted to be received within a hydraulic cylinder 52 which slidably receives a piston 53 mounted on the end of the piston rod 15. For the purpose of securing the cylinder 52 and cylinder head 51 in position on the housing 10, we may employ a circular collar 54 which surrounds the end of the cylinder 52 and is counterbored for the reception of a split spring ring 55 disposed in an annular groove in the outer surface of the cylinder 52. An outwardly projecting annular flange 56 on the cylinder head 51 is received between the outer surface of the housing 10 and the adjacent end of the cylinder 52, so that when the collar 54 is urged toward the housing 10, as by means of the screws 57, the flange 56 will be clamped between the end of the cylinder and the face of the housing 10. Desirably, seal rings 58 and 59 are provided between the cylinder head 51 and cylinder 52 and between the pilot 50 and the pilot-receiving opening in the housing 10. A seal 60 is also provided for the piston rod 15 where it passes through the head 51.

Neglecting for the time being the effect of fluid in the cylinder 52, it will be obvious that rotative effort applied to the steering shaft 45 through the conventional steering wheel (not shown) will rotate the cam 17 and cause the rock shaft 12 to swing about its axis. The effort required so to swing the rock shaft will be reflected as an axially directed thrust exerted by the stud 21 on one or the other of the side walls of the groove 20. Such thrust will tend to displace the cam 17 axially of itself against the force applied to the cam by one or the other of the dished washers 36 acting through its associated race 34 and anti-friction bearing elements. So long as the axial thrust applied to the cam by the stud 21 is insufficient to overcome the opposition to cam-movement exerted by the dished washers, the cam remains in fixed axial position. However, should the axial thrust exceed the force exerted by the dished washer opposing it, the latter will yield and permit the cam to move axially. This movement is utilized, through means hereinafter set forth, to control the flow of pressure fluid to and from the cylinder 52 in a manner which will assist the operator in effecting the desired movement of the steering gear. In this connection, it should be noted that when the cam 17 is displaced in either direction from its normal position the dished washer 36 which might otherwise assist in effecting such movement is rendered ineffective to do so by reason of the split spring ring 38 associated with it. For example, assume that the stud 21 is urging the cam 17 to the left in Figs. 1 and 2, such movement being opposed by the dished washer 36 at the left-hand end of the cam. The dished washer 36 at the right-hand end of the cam (Fig. 2) exerts a leftward force on the cam through the associated bearing; but as soon as the cam moves to the left, the split spring ring 38 carries the plane washer 37 out of engagement with the pilot 42. The reaction of the washer 36 at the right-hand end of the cam is then taken by the shoulder 39; thus relieving the cam of the leftward effort previously exerted upon it by the associated dished washer. As a result of this mode of operation, the cam 17 is preloaded and will not depart from its normal axial position until the force exerted on it by the stud 21 attains or exceeds a predetermined maximum.

The control device shown in the drawing for controlling flow of pressure fluid to and from the cylinder 52 comprises a valve housing 65, conveniently mounted on the sleeve 43 and provided with a ported liner 66. A valve core 67 axially slidable within the liner 66 is connected to a lever 68 responsive to axial movements of the cam 17. For this purpose the lever, which is pivotally mounted intermediate its length as indicated at 68', has its lower end received in an annular groove 69 in the cam-hub 30 and its upper end connected to the valve core 67 through a rod 70. For the purpose of adjusting the valve core 67, the rod 70 is desirably screw-threadedly received therein and provided with a lock nut 71.

The valve liner 66 has four axially spaced ports 75, 76, 77, and 78. The valve core 67 has two lands 80 and 81, a central passage 82, and ports 83 and 84 connecting the passage 82 respectively with the regions lying outwardly beyond the lands 80 and 81 and between the valve body and the valve liner. The lands 80 and 81 are spaced apart by a distance equal to the interval between the ports 76 and 78 and have widths slightly less than the widths of those ports.

The ports 75 and 77 are connected respectively through conduits 86 and 87 (Fig. 1) with the inlet and outlet of a power-operated pump 88, while the ports 76 and 78 are connected respectively through conduits 89 and 90 with the left-hand end and the right-hand end of the cylinder 52. As shown, a tank 86' is provided in conduit 86 to accommodate for volume variations such as result from temperature changes and from the fact that the piston rod 15 modifies the cross-sectional area of that portion of the cylinder through which it extends.

With the cam 17 in its normal position, the valve core 67 occupies the position indicated in Fig. 3 with the lands 80 and 81 centered respectively relative to the ports 76 and 78. As the lands are narrower than the ports, pressure fluid flows from the pump 88 through the conduit 87 to the valve port 77, where it divides into two streams, one flowing over the land 80 to the port 75 and the other flowing over the land 81 and through the valve-core by way of port 84, passage 82, and port 83 to the valve port 75. Combining in the valve port 75, both streams flow to the pump through the conduit 86. When the valve core is properly positioned axially of itself, the pressures respectively existing at the ports 76 and 78 and transmitted through the conduits 89 and 90 to opposite ends of the cylinder 52 will be such that their resultant effect on the piston 53 will be substantially zero. As long as this condition obtains—i. e., as long as the steering effort is below that which will cause axial displacement of the cam 17 and consequent movement of the valve core 67—the steering gear operates under manual control, fluid displaced by movements of the piston 53 being, in effect, transferred from one end of the cylinder to the other through the valve.

When the steering effort becomes great enough to cause axial displacement of the cam 17, the valve core 67 is displaced and fluid under pressure is supplied to the cylinder 52 to aid the operator in overcoming the steering effort. For example, assume that the steering shaft 45 is being rotated manually in a direction to cause clockwise swinging of the shaft 12. Under that condition, the stud 21 will exert a rightward effort on the cam 17; and if that effort exceeds the preloading of the cam, the cam will move to the right and cause the valve core 67 to move to the left. Leftward movement of the valve core will decrease the resistance to fluid flow from the valve port 77 to the port 76 and from the port 78 through the valve core to the port 75, and will increase the resistance to flow from the port 76 to the exhaust port 75 and from the supply port 77 to the port 78. As a result, the pressure in the left-hand end of the cylinder 52 will increase and that in the right-hand end will decrease, thus forcing the piston 53 to the right and applying clockwise effort to the arm 18 and shaft 12. If the displacement of the valve core 67 is great enough, the land 80 will shut off all flow from the port 76 to the exhaust port 75 and the land 81 will shut off all flow from the supply port 77 to the port 78. By appropriately locating the pivot 68' of the lever 68, such lever can be employed as a movement-multiplier to increase the effect of cam displacement on movement of the valve core 67.

If the operator is attempting to swing the shaft 12 in the counterclockwise direction against an effort great enough to overcome preloading of the cam 17, the reverse series of operations occurs. That is, the cam 17 will be displaced to the left and the valve core 67 to the right, thus increasing pressure in the right-hand end of the cylinder 52 and decreasing pressure in the left-hand end, as a result of which the piston 53 will be forced to the left and the block 23 will exert a counterclockwise effort on the arm 18.

In order to obtain the most satisfactory results in operation of the device, it is essential that the valve core 67 be accurately positioned to produce balanced pressures in the cylinder 52 whenever the cam occupies its normal position. To aid in attaining the proper adjustment of the valve core 67, the lands 80 and 81 are accurately located with respect to the machined outer end face 92 of the valve core, and the ports in the liner 66 are accurately located from the machined outer end face 93 of the liner, the arrangement being such that when the two faces 92 and 93 are flush with each other the lands 80 and 81 will be so centered relative respectively to the ports 76 and 78 that the pressures in the two ends of the cylinder 52 will balance each other and be without significant effect in tending to move the piston 53. The outer end of the valve core 67 may be provided with a transverse slot 94 adapted to receive a screw-driver or equivalent tool for use in rotating the valve core on the threaded end of the rod 70. For the purpose of projecting the valve mechanism, we may provide a removable cover 95 adapted for attachment to the outer end of the valve body 65.

In adjusting the device for operation after the valve body 65 has been mounted on the sleeve 43 and the sleeve has been secured in position on the housing 10, the steering shaft 45 is rotated if necessary to relieve all steering effort and thus insure that the cam 17 will occupy its normal position, the cover 95 on the valve body is removed, the lock nut 71 is loosened, and the valve core 67 is rotated on the threads of the rod 70 until its outer face 92 is accurately flush with the outer face 93 of the liner 66, whereupon the lock nut 71 is tightened and the cover 95 replaced.

Desirably, the two openings 32 and 33 in the housing 10 are identical, so that either may receive the sleeve-pilot 42 while the other receives the spacer 40 and is closed by the cap 41. It is also desirable that the housing 10 be provided with identical openings 49 located in alignment in opposite sides of the casing and adapted alternatively to receive the pilot 50 of the cylinder 52. By so constructing the housing, the cylinder 52 and the sleeve 43 may be placed on either side thereof, and the sleeve cylinder may either be on the same or on opposite sides of the casing with respect to each other. The possibilities in respect to the alternative positioning of the sleeve 43 and cylinder 52 greatly increase the flexibility of installation of the steering gear. The opening 49 on the side of the casing 10 remote from the cylinder 52 may be covered with a removable cap 97. To facilitate interchange in the position of the cap 97 and the hydraulic cylinder, the cap and the collar 54 are drilled in corresponding patterns for the passage of the screws 57 which secure them to the sides of the housing. The same arrangement may be employed in the case of the cap 41 and the sleeve-flange 44, which are drilled in similar patterns for the passage of screws 98 that extend into threaded openings in the housing 10. By appropriately locating the holes which receive the screws 98, the sleeve 43 may be mounted in a plurality of different positions of angular adjustment about the axis of the openings 32 and 33, thus making it possible to position the valve 65 to best advantage. Since the cylinder 52 is rotatable relatively to the collar 54, it can be oriented in any position about its axis.

Although we have shown the hydraulic control valve and the steering shaft 45 as operatively connected to the same end of the cam 17, it is to be understood that such arrangement is not essential.

In Fig. 6 we have illustrated, for one end of the cam 17, a modified form of means for rotatably supporting and yieldingly centering such cam. In the arrangement there shown, the cam-body is provided with plain end portions rotatably received in bearing openings 101 provided in the side walls of the housing 10 and adapted to support the cam against radial loads, while a simple thrust-type anti-friction bearing 134 is provided for each end of the cam for the transmission of axial loads. Between the bearing 134 and a shoulder 102 formed by the end of the cam-body there is disposed an axially movable collar 103 having an annular series of openings each adapted to receive a compression spring 104 acting on the bearing 134 and urging it axially outward. Such outward movement of the bearing 134 under the forces exerted on it by the several springs 104 is limited by a split spring ring 138 on the associated cam-hub. As in the arrangement shown in Fig. 1, abutments, such as the pilot 142 of sleeve 143, position the assembly of the cam, collar 103, springs 104, and bearing 134 axially of itself in such a way that the springs 104 at opposite ends of the cam hold it with predetermined force in its normal position.

Still another modified form of cam-locating means is illustrated in Fig. 7. Here the anti-friction bearing is of the combined radial and thrust type, the outer race 234 being slidably supported in the housing 10, as the race 34 is supported in Fig. 1. The dished washer 36 of Figs. 1 and 2 is replaced with an annular series of compression springs 236 seated in recesses in the outer face of the race 234 and bearing against a plane washer 237. Outward movement of the washer 237 relative to the cam is limited by a split spring ring 238, while its outward movement relative to the casing is limited by an abutment such as the pilot 242 on the sleeve 243.

In Fig. 8, we have illustrated a modified form of means for preserving parallelism between the rock shaft 12 and the axis of the pin which carries the block 23. As there shown, the pin 124, on which the block 23 is mounted, extends through and beyond the piston-rod head 114 and into a bearing block 106 slidably received in a groove 107 formed in the housing 10 at the side of the guide-way for the piston-rod head 114. If it is deemed necessary to provide bearing surfaces between the block 106 and the piston-rod head 114, the hole in the latter through which the pin 124 passes may be counterbored to receive a circular boss 108 on the block 106.

We claim as our invention:

1. In a power-operated steering gear, a housing having a side wall provided with an opening, a cam, means rotatably supporting said cam in said housing and in alignment with said opening, a rock shaft supported in said housing and having a laterally projecting arm co-operating with said cam, said cam being generally helical whereby the effort transmitted between it and the shaft will react on the cam with an axial component, said cam-supporting means permitting a limited axial movement of the cam, yielding means biasing the cam toward a normal position intermediate its limits of axial movement, a support, a manually rotatable steering shaft mounted in said support in fixed axial position, means for securing said support to said housing with the steering shaft and cam in coaxial relation, means interconnecting said cam and shaft for joint rotation while permitting axial movement of the cam, and power-operated means including a control device responsive to axial movements of the cam for rotating said rock shaft, said control device being mounted on said support.

2. In a power-operated steering gear, a housing having a side wall provided with an opening, a cam, means rotatably supporting said cam in said housing and in alignment with said opening, a rock shaft supported in said housing and having a laterally projecting arm co-operating with said cam, said cam being generally helical whereby the effort transmitted between it and the shaft will react on the cam with an axial component, said cam-supporting means permitting a limited axial movement of the cam, yielding means biasing the cam toward a normal position intermediate its limits of axial movement, a support, a manually rotatable steering shaft mounted in said support in fixed axial position, means for securing said support to said housing with the steering shaft and cam in coaxial relation, means interconnecting said cam and shaft for joint rotation while permitting axial movement of the cam, and power-operated means including a control device responsive to axial movements of the cam for rotating said rock shaft.

3. The invention set forth in claim 2 with the addition that said side wall is one of two spaced, opposite walls each provided with an opening aligned with said cam, said cam being reversible in its supporting means, and said support-securing means being adapted to secure said support alternatively at either side of said housing.

4. The invention set forth in claim 2 with the addition that said support has a pilot portion receivable in said opening.

5. In a power-operated steering gear, a housing having spaced, opposite side walls provided with first and second pairs of aligned openings, a manually rotatable cam, means in said housing for rotatably supporting said cam between the openings of said first pair and in alignment therewith, said cam having an axially extending hub at one end and being reversible in said cam-supporting means whereby said hub may extend outwardly alternatively through either of the aligned openings, a slide, means in said housing mounting said slide for reciprocation along a path between said side walls and parallel to the common axis of the second pair of openings, a rock shaft mounted in said housing between and with its axis in a plane perpendicular to the cam-axis and to the path of movement of said slide, said rock shaft having rigid with it arms operatively connected respectively to said cam and slide, said cam being generally helical whereby effort transmitted between it and the rock-shaft will react on the cam with an axial component, said cam-supporting means permitting a limited axial movement of said cam, means biasing said cam toward a normal position intermediate the limits of such axial movement and yieldable to permit axial movement of the cam, a hydraulic cylinder, means for mounting said cylinder alternatively on either side of said housing in alignment with said second pair of openings, a piston in said cylinder, a piston-rod interconnecting said piston and slide and extending through the adjacent one of the openings aligned with the cylinder, means including a source of fluid under pressure and a control valve for forcing said piston alternatively in either direction, means for mounting said valve alternatively on opposite sides of said housing for co-operation with the cam-hub, and means operatively interconnecting the valve and cam-hub.

6. In a power-operated steering gear, a housing having a pair of spaced, opposite side walls provided with aligned openings, a rock shaft mounted in said housing on an axis displaced from that of said openings, a slide, means supporting said slide for reciprocating motion along a path extending in the same direction as the common axis of said openings, an operative connection between said slide and rock shaft, a hydraulic cylinder, a piston therein, a piston rod operatively interconnecting the piston and slide, and means for securing said cylinder alternatively on either side of said housing with said piston rod extending through the adjacent one of said openings.

7. The invention claimed in claim 6 with the addition that said cylinder has a head provided with a pilot portion alternatively receivable in either of said openings.

8. In a power-operated steering gear, a rock shaft, manually operated means for rotating said rock shaft, hydraulic means for rotating said rock shaft, said hydraulic means including a valve comprising a cylinder and an axially slidable core therein for controlling rotation of the rock shaft by said hydraulic means, said core and cylinder having end faces so located that when they are in a predetermined relative axial position said valve occupies a neutral position in which it renders the hydraulic means ineffective to rotate the rock shaft, and a connection between said manually operated means and said valve core for moving said valve core from its neutral position when the effort transmitted between the rock shaft and manually operated means exceeds a predetermined value, said connection being adjustable to permit the end faces of said valve-core and cylinder to be brought into said predetermined relative axial position.

9. In a power-operated steering gear, a rock shaft, manually operated means for rotating said rock shaft, hydraulic means for rotating said rock shaft, said hydraulic means including a valve comprising a cylinder and an axially slidable core therein for controlling rotation of the rock shaft by said hydraulic means, said core and cylinder having end faces so located that when they are flush with each other said valve occupies a neutral position in which it renders the hydraulic means ineffective to rotate the rock shaft, and a connection between said manually operated means and said valve core for moving said valve core from its neutral position when the effort transmitted between the rock shaft and manually operated means exceeds a predetermined value, said connection being adjustable to permit the end faces of said valve-core and cylinder to be brought into said flush relationship.

10. In a power-operated steering gear, a housing, a manually rotatable generally helical cam supported in said housing for rotative and limited axial movement, an operative connection between said cam and rock-shaft so constructed and arranged that effort transmitted between the cam and shaft reacts with an axial component on the cam, a pair of thrust members movable axially of the cam, yielding means acting between the cam and thrust members and urging the thrust members in opposite axial directions, abutments on the cam to limit movement of the thrust members relative to the cam under the influence of the yielding means, abutments on the housing for limiting movement of said thrust members relative to the housing, power-operated means for rotating the rock shaft, and a control device for said power-operated means responsive to axial movement of the cam.

11. In a power-operated steering gear, a housing, a manually-rotatable generally helical cam supported in said housing for rotative and limited axial movement, an operative connection between said cam and rock-shaft so constructed and arranged that effort transmitted between the cam and shaft reacts with an axial component on the cam, a pair of springs acting oppositely on the cam and reacting on the housing to bias the cam toward a normal position intermediate its range of axial movement, means effective when the cam moves against the force exerted on it by either spring to transfer from the housing to the cam the reaction of the other spring, power-operated means for rotating the rock shaft, and a control device for said power-operated means responsive to axial movement of the cam.

12. The invention set forth in claim 11 with the addition of an anti-friction bearing transmitting the biasing effort of each spring to the cam.

13. In a power-operated steering gear, a housing, a rock-shaft mounted therein, said housing having a guide-way offset from said shaft and extending in a plane perpendicular thereto, a slide reciprocable in said guide-way, said shaft being provided with a rigid arm projecting radially from the shaft at one side of said guide-way and provided with a radially extending opening, force-transmitting means extending laterally from said slide into said opening for operatively interconnecting the slide and arm, power-operated means for moving said slide along said guide-way, said slide and guide-way being of circular cross-section, and means acting between said slide and housing for preventing rotation of the slide in the guide-way.

14. In a power-operated steering gear, a housing, said housing having a wall provided with an opening, a hydraulic cylinder having an open end, a removable cylinder-head having end portions respectively received in said housing-opening and in the open end of said cylinder and provided intermediately with an exterior annular flange, a collar surrounding said cylinder, means limiting movement of said collar along said cylinder toward said housing, means for forcing said collar toward the housing to clamp the flange on said head between the housing and the adjacent end of the cylinder, said head having a central opening, a piston in said cylinder, and a piston rod extending through said central opening into said housing for connection to a movable element.

15. In a power operated steering gear, a housing, a manually rotated cam, means rotatably supporting said cam in said housing, a rock shaft supported in said housing and having a laterally projecting arm co-operating with said cam, said cam being generally helical whereby the effort transmitted between it and the rock shaft will react on the cam with an axial component, said cam-supporting means permitting a limited axial movement of the cam, a motor connected to said rock shaft for rotating it alternatively in either direction, a control device for said motor, and a connection between said cam and control device whereby axial movement of the cam will cause the control device to actuate the motor, said connection being adjustable to vary the condition of the control device for any axial position of the cam.

References Cited in the file of this patent

UNITED STATES PATENTS

| Number | Name | Date |
|---|---|---|
| 358,286 | Mayher | Feb. 22, 1887 |
| 1,633,209 | Henninger | June 21, 1927 |
| 1,790,620 | Davis | Jan. 27, 1931 |
| 1,937,470 | Davis | Nov. 28, 1933 |
| 2,053,272 | Eaton | Sept. 8, 1936 |
| 2,065,513 | Centervall | Dec. 29, 1936 |
| 2,114,165 | Cochran | Apr. 12, 1938 |
| 2,213,271 | Davis | Sept. 3, 1940 |
| 2,362,930 | Robbins | Nov. 14, 1944 |
| 2,391,819 | Creson | Dec. 25, 1945 |
| 2,410,049 | Davis | Oct. 29, 1946 |
| 2,433,209 | Creson et al. | Dec. 30, 1947 |
| 2,605,854 | MacDuff | Aug. 5, 1952 |

OTHER REFERENCES

Product Engineering, vol. 22, Issue No. 1, page 112, Jan. 1951.